(12) United States Patent
Nagasaka

(10) Patent No.: US 10,531,238 B2
(45) Date of Patent: Jan. 7, 2020

(54) COMPANION DETERMINING DEVICE, COMPANION DETERMINING SYSTEM, COMPANION DETERMINING METHOD AND COMPUTER-READABLE MEDIUM

(71) Applicant: CASIO COMPUTER CO., LTD, Tokyo (JP)

(72) Inventor: Akihiko Nagasaka, Musashimurayama (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 16/136,707

(22) Filed: Sep. 20, 2018

(65) Prior Publication Data

US 2019/0098454 A1    Mar. 28, 2019

(30) Foreign Application Priority Data

Sep. 22, 2017   (JP) ................................ 2017-181877

(51) Int. Cl.
| | |
|---|---|
| *H04W 4/029* | (2018.01) |
| *H04W 4/80* | (2018.01) |
| *H04W 8/00* | (2009.01) |
| *H04W 4/02* | (2018.01) |
| *H04L 29/08* | (2006.01) |

(52) U.S. Cl.
CPC ............ *H04W 4/029* (2018.02); *H04L 67/22* (2013.01); *H04W 4/023* (2013.01); *H04W 4/027* (2013.01); *H04W 4/80* (2018.02); *H04W 8/005* (2013.01)

(58) Field of Classification Search
CPC ....... H04W 4/029; H04W 4/80; H04W 4/023; H04W 4/027; H04W 8/005; H04L 67/22

USPC ........................................................ 455/456.1
See application file for complete search history.

(56) References Cited

U.S. PATENT DOCUMENTS

| | | | | |
|---|---|---|---|---|
| 7,302,272 | B2 * | 11/2007 | Ackley ................. | H04M 1/663 455/466 |
| 8,930,134 | B2 * | 1/2015 | Gu ...................... | G06Q 30/0205 701/434 |
| 9,392,406 | B2 * | 7/2016 | Houri .................... | G01S 5/0252 |
| 9,477,841 | B2 * | 10/2016 | Rasband ............... | G06F 21/606 |

FOREIGN PATENT DOCUMENTS

| | | |
|---|---|---|
| JP | 2007-172287 A | 7/2007 |
| JP | 2008-113184 A | 5/2008 |
| JP | 2008-250707 A | 10/2008 |

(Continued)

OTHER PUBLICATIONS

JPO; Application No. 2017-181877; Notice of Reasons for Refusal dated Nov. 5, 2019.

*Primary Examiner* — Julio R Perez
(74) *Attorney, Agent, or Firm* — Fitch, Even, Tabin & Flannery LLP

(57) ABSTRACT

A companion determining device determines presence of a companion of a tracked user. The device includes a receiver, a receipt determiner and a presence determiner. The receiver receives a user identifier from an external device via a near-field wireless communication link. The receipt determiner determines whether the receiver has received the user identifier sent from the external device. The presence determiner determines presence of a companion acting with the tracked user based on determination by the receipt determiner.

16 Claims, 13 Drawing Sheets

(56) References Cited

FOREIGN PATENT DOCUMENTS

| | | |
|---|---|---|
| JP | 2010-245825 A | 10/2010 |
| JP | 2011-106864 A | 6/2011 |
| JP | 2015-99527 A | 5/2015 |
| JP | 2015-146893 A | 8/2015 |
| JP | 2016-123055 A | 7/2016 |
| JP | 2017-58809 A | 3/2017 |
| WO | 2007138816 A1 | 12/2007 |

* cited by examiner

| PUPIL IDENTIFIER | RECEIVING TIME | ELAPSED TIME |
|---|---|---|
| 00001 | 01:50:00 | 00:05:24 |
| 00002 | 01:54:00 | 00:05:20 |

| 16387 | 49153 | 35° 42' 32.42"N, 139° 44' 48.75"E | 2016/3/28 16:30 |
|---|---|---|---|
| MAJOR | MINOR | LOCATION | TIME |

PUPIL C HAS PASSED BY XXX AT 16:30, MARCH 28, 2016 WITH A COMPANION.
THE LONGEST STAYING COMPANION IS PUPIL A.

COMPANION DETERMINING DEVICE, COMPANION DETERMINING SYSTEM, COMPANION DETERMINING METHOD AND COMPUTER-READABLE MEDIUM

CROSS REFERENCE TO RELATED APPLICATION

This application is based upon and claims the benefit of priority under 35 USC 119 of Japanese Patent Application No. 2017-181877 filed on Sep. 22, 2017, the entire disclosure of which, including the description, claims, drawings and abstract, is incorporated herein by reference in its entirety.

BACKGROUND OF THE INVENTION

1. Field of the Invention

The present invention relates to a companion determining device, a companion determining system, a companion determining method and a computer-readable medium.

2. Description of Related Art

JP2008-250707A discloses a tracking system. The tracking system includes IC tags carried by pupils and several tracking nodes allocated on their school routes. In response to a beacon signal from a tracking node, an IC tag sends identifier to the tracking node, and the tracking node sends the identifier received from the IC tag to a tracking center. The tracking center maintains the history of pupils passing by tracking nodes based on the identifier received from the tracking nodes.

SUMMARY OF THE INVENTION

According to one aspect of the present invention, a companion determining device that determines presence of a companion of a tracked user includes:
a receiver which receives a user identifier from an external device via a near-field wireless communication link;
a receipt determiner which determines whether the receiver has received the user identifier sent from the external device; and
a presence determiner which determines presence of a companion acting with the tracked user based on determination by the receipt determiner.

According to another aspect of the present invention, a companion determining system includes:
the companion determining device;
a wireless communication device which sends and receives data to and from the companion determining device via the near-field wireless communication link;
a server which sends and receives data to and from the wireless communication device; and
a terminal device carried by a guardian tracking the user, wherein
the companion determining device sends information, including the user identifier of the tracked user and the user identifier of a companion acting with the tracked user, to the wireless communication device via the near-field wireless communication,
when the wireless communication device receives the information including the user identifier of the tracked user and the user identifier of the companion acting with the tracked user from the companion determining device, the wireless communication device obtains the current position and the current time and sends the received information and the obtained information to the server, and
the server sends information on the positions of places the tracked user passes by, the time at which the tracked user passes by each place, and the companion acting with the tracked user to the terminal device based on the information received from the wireless communication device.

According to still another aspect of the present invention, a method for determining presence of a companion of a tracked user in a companion determining device includes:
a receipt step of receiving a user identifier sent from an external device via a near-field wireless communication link;
a receipt determination step of determining whether the user identifier sent from the external device is received in the receipt step; and
a presence determination step of determining presence of a companion acting with the tracked user based on determination in the receipt determining step.

According still another aspect of the present invention, a computer-readable medium stores a program that causes a computer in a companion determining device that determines presence of a companion of a tracked user to function as:
a receiver which receives a user identifier sent from an external device via a near-field wireless communication link;
receipt determiner which determines whether the receiver has received the user identifier sent from the external device; and
a presence determiner which determines presence of a companion acting with the tracked user based on determination by the receipt determiner.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENT

Hereinafter, one or more embodiments of the present invention will be described with reference to the drawings. However, the scope of the invention is not limited to the disclosed embodiments.

Configuration of Tracking System 100

Figure 1:
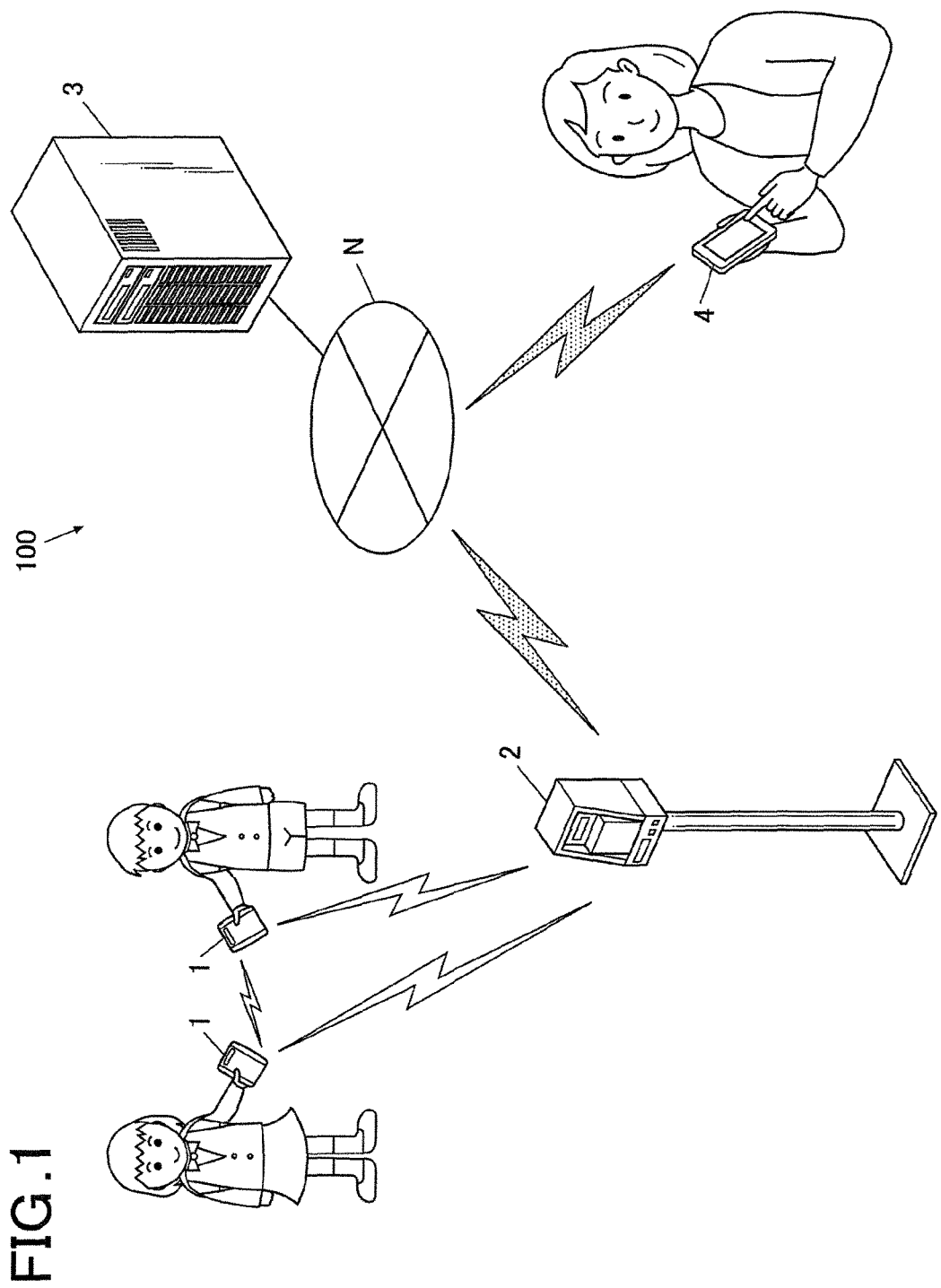
FIG. 1 is an example entire configuration of the tracking system.

FIG. 1 is an entire configuration of a tracking system 100.

The tracking system 100 is a companion determining system that determines one or more friends (companions) of a tracked pupil to ensure the safety of the pupil on the way to and back from school. With reference to FIG. 1, the tracking system 100 includes a POD terminal 1 carried by each tracked pupil, a wireless communication device 2 installed in a town or along a school route, a server 3, and a tracking terminal 4 carried by a parent of the tracked pupil.

For communications between the POD terminals 1, the beacon information can be sent and received via a near-field wireless communication link. For communications between the POD terminal 1 and the wireless communication device 2, the beacon information can be sent from the POD terminal 1 to the wireless communication device 2. For communications between the wireless communication device 2 and the server 3 and between the server 3 and the tracking terminal 4, data can be sent and received via a communication network N, such as the Internet.

Configuration of POD Terminal 1

Figures 2, 3:
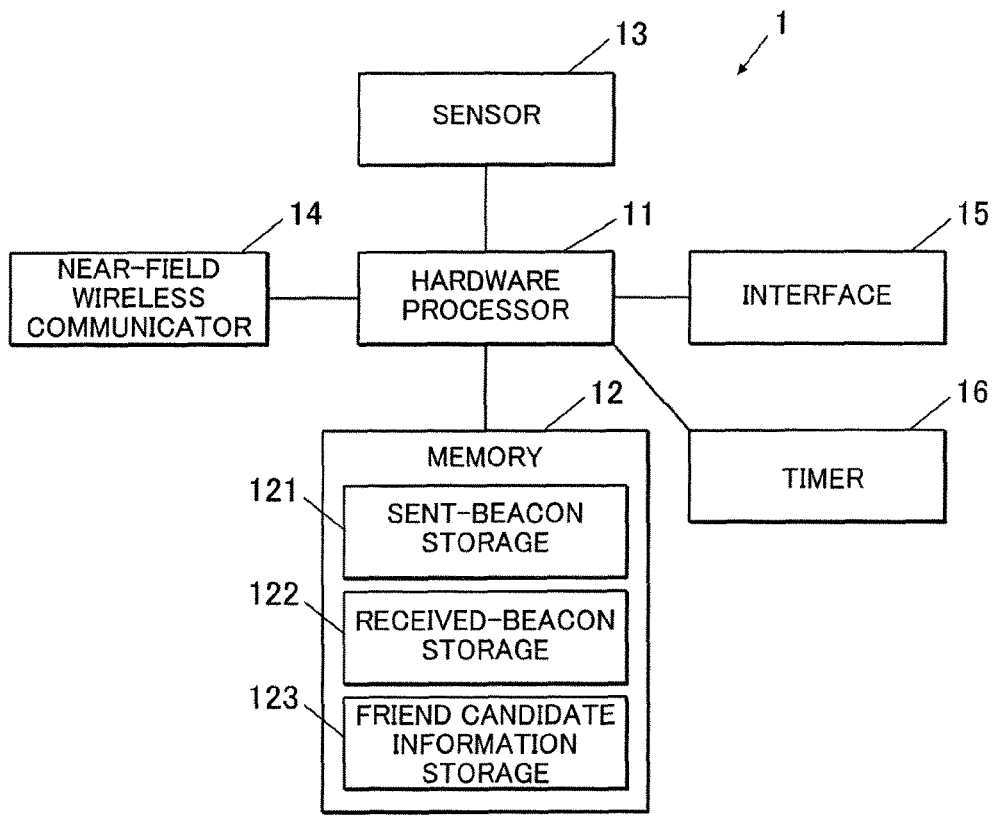
FIG. 2 is a block diagram illustrating a functional configuration of a POD terminal.
FIG. 3 illustrates exemplary data stored in a friend candidate information storage.

FIG. 2 is a block diagram illustrating a functional configuration of the POD terminal 1, which functions as a companion determining device. As shown in FIG. 2, the POD terminal 1 includes a hardware processor 11, a memory 12, a sensor 13, a near-field wireless communicator 14, an interface 15, and a timer 16. The hardware processor 11 is connected to each unit via a bus.

The hardware processor 11 includes a processor (not shown) and a memory (not shown). The processor executes programs stored in the memory 12 to perform various calculations and control various units. The memory functions as a working area for executing these program The hardware processor 11 works in cooperation with the programs stored in the memory 12 to perform a process, described below, of sending and receiving the beacon information and functions as an action information obtainer, a hardware processor, and a determiner.

The memory 12 includes a non-volatile semiconductor memory and a hard disk. The memory 12 contains OS programs and various processing programs executed by the hardware processor 11 and data required to execute these programs. The memory 12 contains, for example, service identifier to identify a service provided by the tracking system 100 and pupil identifier of pupils, users of the POD terminal 1.

The memory 12 includes a sent-beacon storage 121, a received-beacon storage 122, and a friend candidate information storage 123.

The sent-beacon storage 121 contains beacon information sent (broadcast) from the near-field wireless communicator 14. The received-beacon storage 122 contains beacon information received from the near-field wireless communicator 14.

The friend candidate information storage 123 contains information on friend candidates obtained from the received beacon information. FIG. 3 illustrates exemplary data stored in the friend candidate information storage 123. As shown in FIG. 3, the friend candidate information storage 123 includes a pupil identifier area, a receiving time area, and an elapsed time area. In detail, the pupil identifier area contains the pupil identifier obtained from the received beacon information (pupil identifier of friend candidates). The receiving time area contains the receiving time of the beacon information. The elapsed time area contains a period of time in which the tracked pupil spent time with a friend candidate identified with the pupil identifier. These areas constitute a single record.

The sensor 13 includes, for example, an acceleration sensor and an angular rate sensor, measures acceleration and an angular rate, and outputs sensor data indicating the results of measurement to the hardware processor 11. The sensor 13 may be a global positioning system (GPS) device.

The near-field wireless communicator 14 can communicate with a near-by external device via a near-field wireless communication ink, such as Bluetooth low energy (BLE) (Bluetooth is a registered trademark). The near-field wireless communicator 14 sends (broadcasts) and receives beacon information from other POD terminals 1 under the control of the hardware processor 11. The near-field wireless communicator 14 functions as a receiver and a transmitter.

The beacon information includes a UUID (128 bits), a major value (16 bits), and a minor value (16 bits).

The UUID according to this embodiment represents the identifier of a service provided by the tracking system 100.

The major value represents pupil identifier of a beacon information sender and the number of friends who act with the sender. The 16 bits of the major value according to this embodiment has the upper two bits representing the number of friends and the lower 14 bits representing pupil identifier. The number of friends can take the following values: 0: None, 1: One, 2: Two, and 3: Three or more.

The minor value represents the pupil identifier of a friend who spends the longest time with the beacon information sender and the information of the friend. The 16 bits of the minor value according to this embodiment has the upper two bits representing a time parameter and the lower 14 bits representing pupil identifier. In details, the time parameter represents the rate of time in which the beacon information sender stayed with the friend in the reporting period. For example, 0: 0% or more to less than 25%, 1: 25% or more to less than 50%, 2: 50% or more to less than 75%, and 3: 75% or more. The reporting period is between a time point obtained by tracing back from a time point of sending beacon information by a predetermined period of time and the time point of the sending beacon information.

The major value and the minor value according to this embodiment are each divided into two parts of two bits and 14 bits. This tracing system can trace up to 16348 people, which is the largest number that can be expressed with the 14 bits. If such a large number of people need not be traced, the number of bits assigned to the pupil identifier may be reduced to increase the number of friends or the value of time parameter.

The interface 15 is provided with various functional buttons. In response to information entered by a user by pressing buttons, the interface 15 outputs the operational information to the hardware processor 11.

The timer 16 counts a relative time from power-on and outputs the counted time to the hardware processor 11.

Configuration of Wireless Communication Device 2

Figure 4:
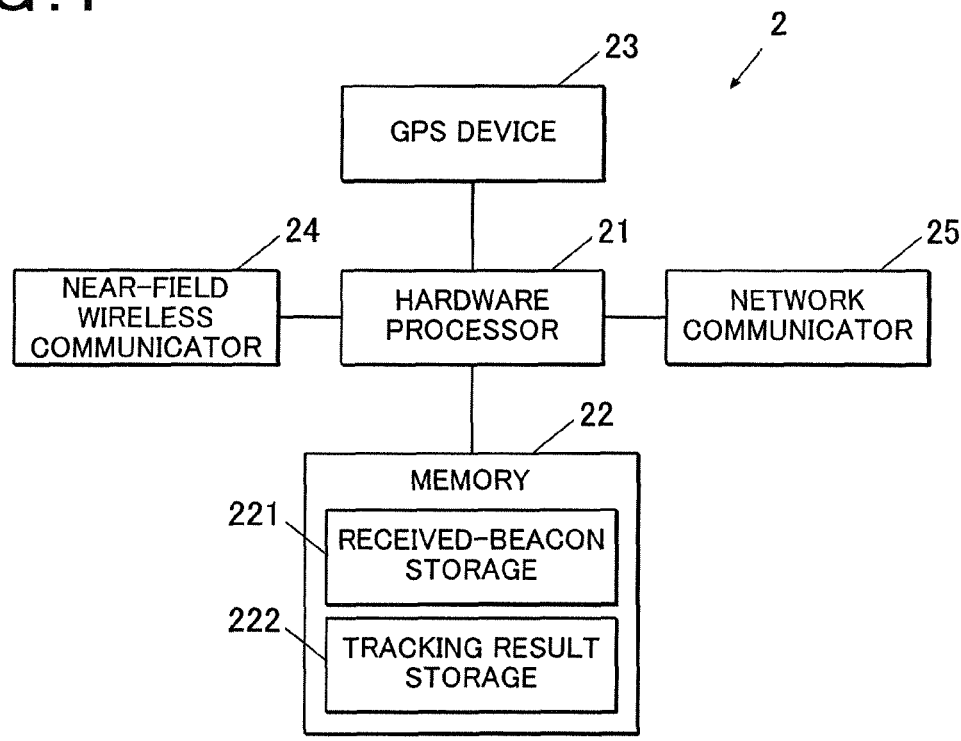
FIG. 4 is a block diagram illustrating a functional configuration of a wireless communication device.

FIG. 4 is a block diagram illustrating a functional configuration of the wireless communication device 2. As shown in FIG. 4, the wireless communication device 2 includes a hardware processor 21, a memory 22, a GPS device 23, a near-field wireless communicator 24, and a network communicator 25. The hardware processor 21 is connected to each unit via a bus.

The hardware processor 21 includes a processor (not shown) and a memory (not shown). The processor executes programs stored in the memory 22 to perform various calculations and control various units. The memory functions as a working area for executing these programs. The hardware processor 21 works in cooperation with the programs stored in the memory 22 to perform a tracking process described below.

The memory 22 includes a non-volatile semiconductor memory and a hard disk. The memory 22 contains OS programs and various processing programs executed by the hardware processor 21 and data required to execute these programs.

The memory 22 includes a received-beacon storage 221 and a tracking result storage 222.

The received-beacon storage 221 contains the received beacon information stored by the near-field wireless communicator 24.

The tracking result storage 222 contains tracking result information generated from the received beacon information.

The GPS device 23 receives radio waves from positioning satellites through an antenna (not shown), performs various calculations to obtain the current position and time, and outputs the obtained information to the hardware processor 21.

The near-field wireless communicator 24 receives beacon information from a near-by external device, such as the POD terminal 1, via a near-field wireless communication link, such as BLE, to output the received beacon information to the hardware processor 21.

The network communicator 25 connects to the communication network N via a wireless, such as Wi-Fi (registered trademark), or a wired interface to send and receive data to and from an external device, such as the server 3.

Configuration of Server 3

Figure 5:
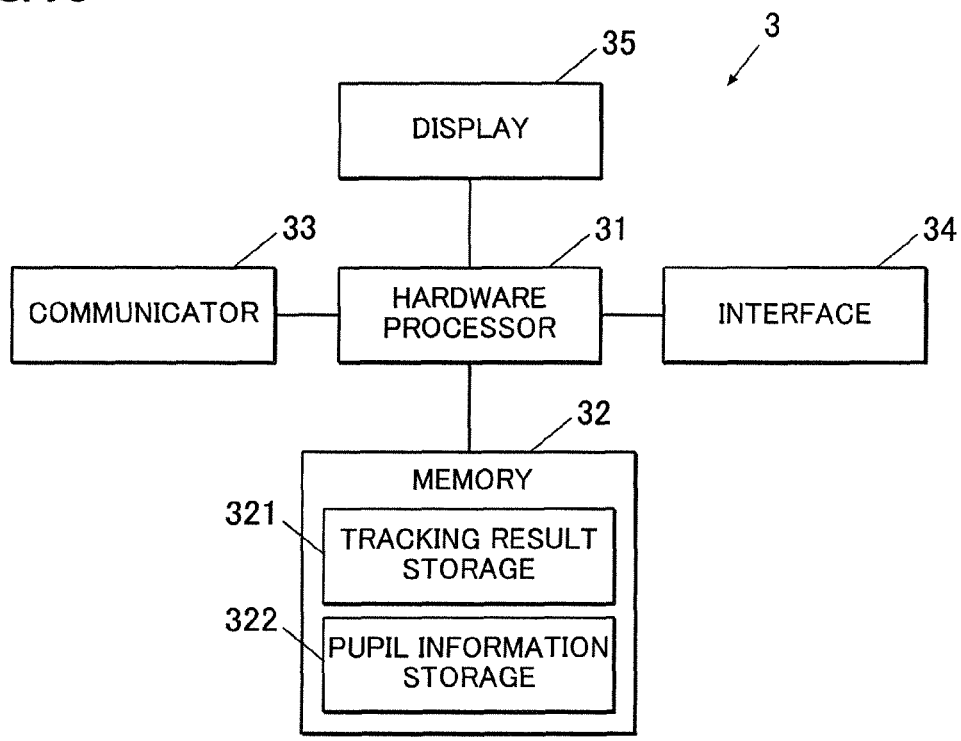
FIG. 5 is a block diagram illustrating a functional configuration of a server.

FIG. 5 is a block diagram illustrating a functional configuration of the server 3. As shown in FIG. 5, the server 3 includes a hardware processor 31, a memory 32, a communicator 33, an interface 34, and a display 35. The hardware processor 31 is connected to each unit via a bus.

The hardware processor 31 includes a processor (not shown) and a memory (not shown). The processor executes programs stored in the memory 32 to perform various calculations and control various units. The memory functions as a working area for executing the programs. The hardware processor 31 works in cooperation with the programs stored in the memory 32 to perform a process to send tracking results described below.

The memory 32 includes a non-volatile semiconductor memory and a hard disk. The memory 32 contains OS programs and various processing programs executed by the hardware processor 31 and data required to execute these programs.

The memory 32 includes a tracking result storage 321 and a pupil information storage 322.

The tracking result storage 321 contains tracking result information received by the communicator 33 from the wireless communication device 2.

Figure 6:
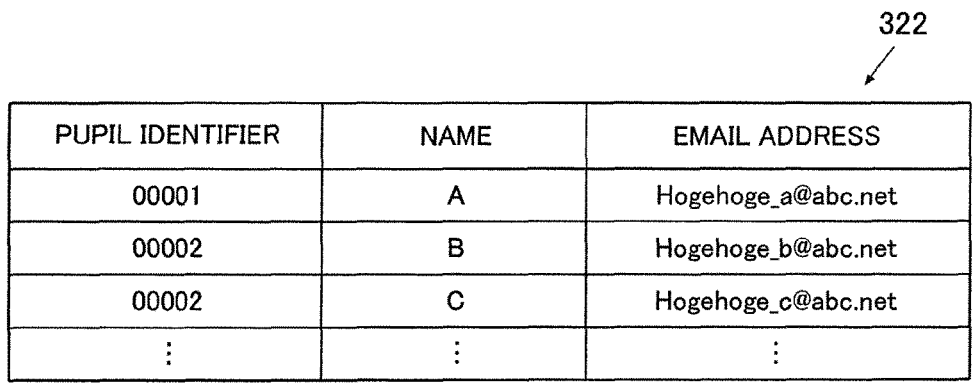
FIG. 6 illustrates exemplary data stored in a pupil information storage.

The pupil information storage 322 contains pupil information of a tracked pupil in the tracking system 100. FIG. 6 illustrates exemplary data stored an the pupil information storage 322. As shown in FIG. 6, the pupil information storage 322 has fields of pupil identifier, name and mail address. The pupil identifier field contains identifier of a tracked pupil. The name field contains the name of the pupil. The mail address field contains an email address of (the tracking terminal 4) to which the results of tracking the pupil are to be sent. This information constitutes a single record.

The communicator 33 includes, for example, a modem, a router, and a network card. The communicator 33 connects to the communication network N and sends and receives data to and from an external device, such as the wireless communication device 2 and the tracking terminal 4.

The interface 34 includes a keyboard including cursor keys, numeric keys, and various functional keys, and a pointing device, such as a mouse. The interface 34 outputs a command signal entered through keyboard or mouse operations to the hardware processor 31.

The display 35 includes a liquid crystal display (LCD) and displays information on the screen in accordance with a display controlling signal from the hardware processor 31.

Configuration of Tracking Terminal 4

The tracking terminal 4 is a terminal device, such as a smart phone, carried by the parent of a tracked pupil.

Figure 7:
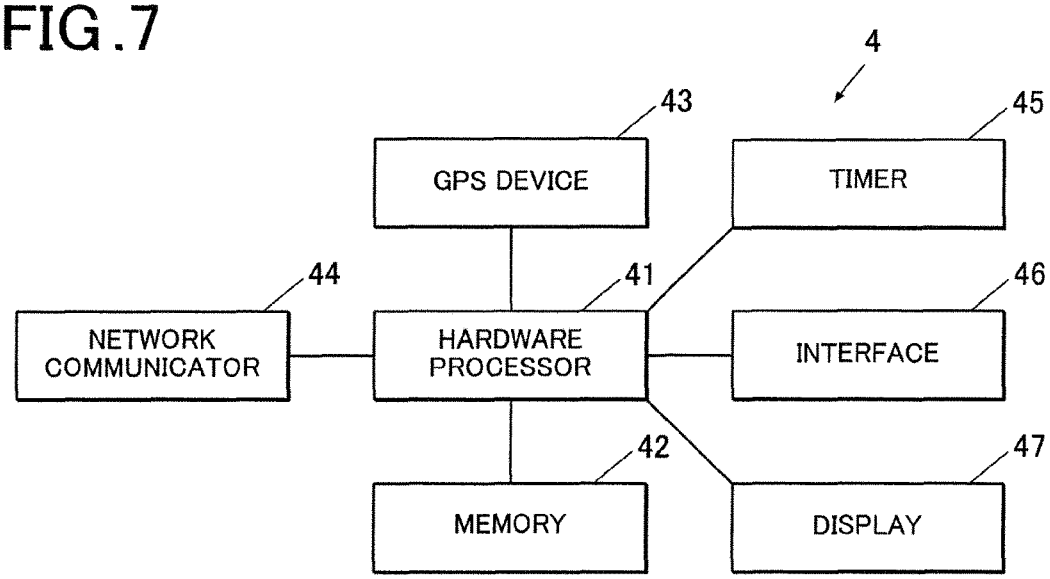
FIG. 7 is a block diagram illustrating a functional configuration of a tracking terminal.

FIG. 7 is a block diagram illustrating a functional configuration of the tracking terminal 4. As shown in FIG. 7, the tracking terminal 4 includes a hardware processor 41, a memory 42, a GPS device 43, a network communicator 44, a timer 45, an interface 46, and a display 47. The hardware processor 41 is connected to each unit via a bus.

The hardware processor 41 includes a processor (not shown) and a memory (not shown). The processor executes programs stored in the memory 42 to perform various calculations and control various units. The memory functions as a working area for executing the programs. The hardware processor 41 works in cooperation with the programs stored in the memory 42 to receive email on tracking results from the server 3 via the network communicator 44 and display the email on the display 47.

The memory 42 includes a non-volatile semiconductor memory and a hard disk. The memory 42 contains OS programs and various processing programs executed by the hardware processor 41 and data required to execute these programs.

The GPS device 43 receives radio waves from positioning satellites through an antenna (not shown), performs various calculations to obtain the current position and time, and outputs the obtained information to the hardware processor 41.

The network communicator 44 is connected to the communication network N via, for example, a base station of a mobile communication network, and sends and receives data to and from an external device, such as the server 3.

The timer 45 includes a real time clock (RTC), obtains the current time, and outputs it to the hardware processor 41.

The interface 46 is provided with various functional buttons. In response to information entered by a user by pressing buttons, the interface 46 outputs the operational information to the hardware processor 41. The interface 46 includes a touch panel having transparent electrodes disposed in a lattice arrangement so as to cover the surface of the display 47. The interface 46 detects various operations using the tips of fingers or a touch pen and outputs the operational information to the hardware processor 41.

The display 47 includes a liquid crystal display (LCD) and displays information on the screen in accordance with a display controlling signal from the hardware processor 41.

Operation of Tracking System 100

The operations of the tracking system 100 will now be explained.

Operation of POD Terminal 1

Figure 8:
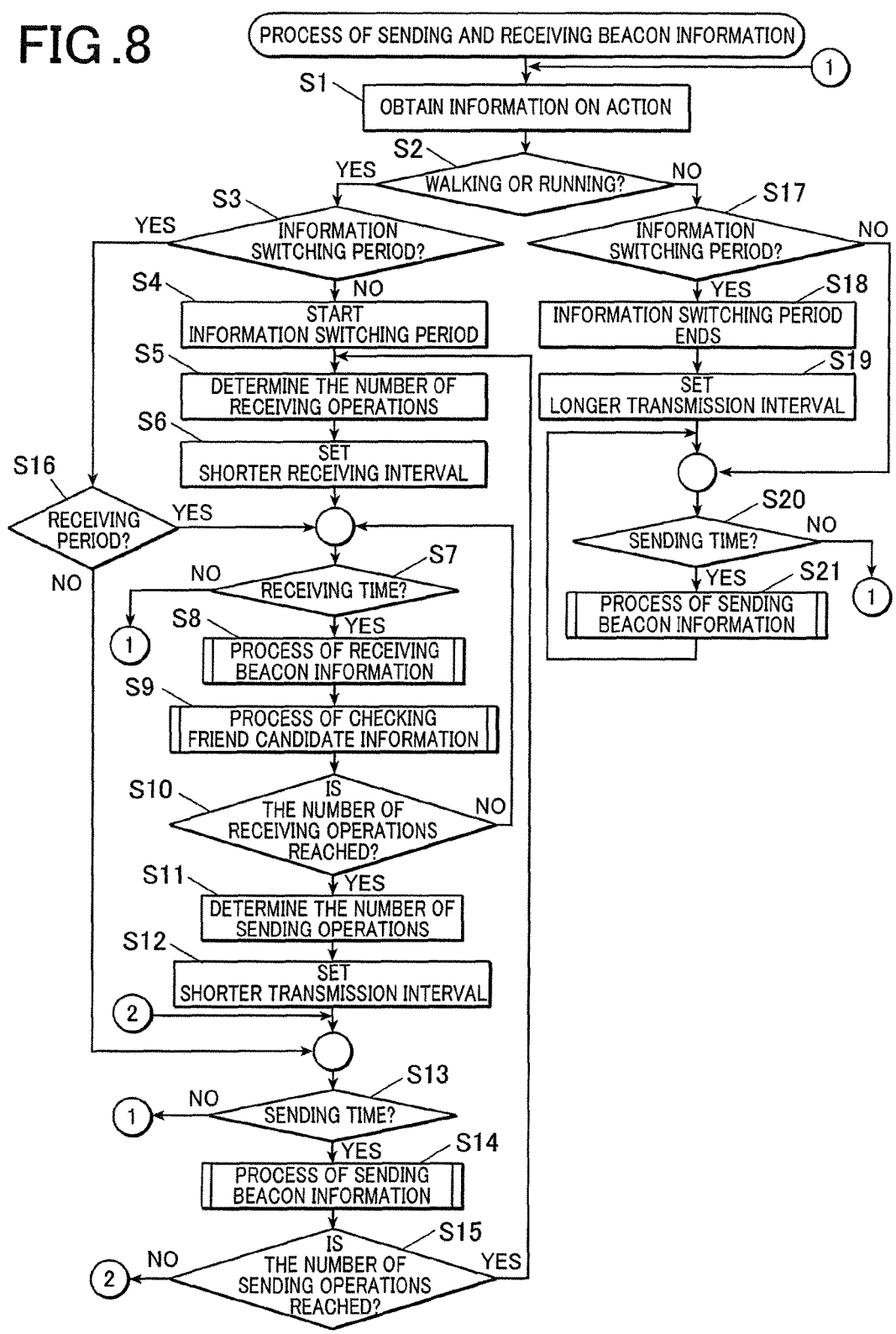
FIG. 8 is a flowchart illustrating a process of sending and receiving beacon information performed by a hardware processor in FIG. 2.

FIG. 8 is a flowchart illustrating the process of sending and receiving beacon information performed by the hardware processor 11 in the POD terminal 1. The process of sending and receiving beacon information is performed in cooperation with the hardware processor 11 and programs stored in the memory 12 when the POD terminal 1 is powered on.

The hardware processor 11 obtains information on the action of a tracked user based on sensor data output from the sensor 13 (Step S1).

For example, the hardware processor 11 assumes that the user is walking or running based on the sensor data output from the sensor 13, and then obtains information indicating whether the user is walking or running.

The hardware processor 11 determines whether the user is walking or running based on the information on action obtained at Step S1 (Step S2).

If the user is walking or running (YES at Step S2), the hardware processor 11 determines whether the tracking system is now in an information switching period (Step S3).

The information switching period refers to a period involving alternation of sending and receiving beacon information by the POD terminal 1. In periods other than the information switching period, the POD terminal 1 only sends beacon information.

If the tracking system is not in the information switching period (NO at Step S3), the hardware processor 11 starts the information switching period (Step S4), determines the number of receiving operations (Step S5), and determines the receiving interval (Step S6). The determined receiving interval is shorter than the transmission interval determined at S19 described below (the first transmission interval).

The hardware processor 11 determines whether the current time is the receiving time based on the determined receiving intervals (Step S7). If not (NO at Step S7), the hardware processor 11 returns to Step S1.

If the receiving time has arrived (YES at Step S7), the hardware processor 11 performs the process of receiving beacon information (Step S8).

Figure 9:
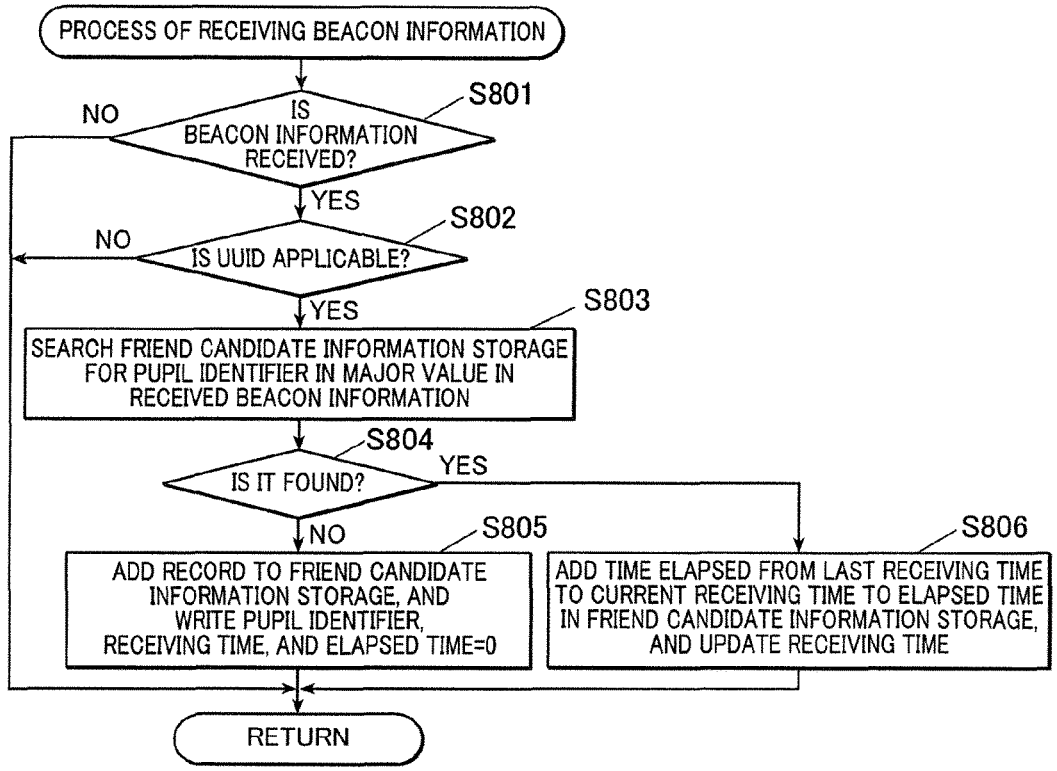
FIG. 9 is a flowchart illustrating a process of receiving beacon information performed by the hardware processor 2.

FIG. 9 is a flowchart illustrating the process of receiving beacon information performed by the hardware processor 11 at Step S8. The process of receiving beacon information is performed in cooperation with the hardware processor 11 and programs stored in the memory 12.

The hardware processor 11 determines whether the near-field wireless communicator 14 has received the beacon information (Step S801).

If not (NO at Step S801), the hardware processor 11 proceeds to Step S9 in FIG. 8.

If the near-field wireless communicator 14 has received the beacon information (YES at Step S801), the hardware processor 11 determines whether the UUID in the beacon information that has been received is the service identifier of the tracking system 100 (Step S802). If not (NO at Step S802), the hardware processor 11 proceeds to Step S9 in FIG. 8.

If the UUID in the beacon information is the service identifier of the tracking system 100 (YES at Step S802), the hardware processor 11 searches the friend candidate information storage 123 for pupil identifier in the major value in the beacon information that has been received (Step S803).

If the relevant pupil identifier is not found in the friend candidate information storage 123 (NO at Step S804), the hardware processor 11 adds a record to the friend candidate information storage 123, writes the pupil identifier in the major value in the beacon information that has been received, the time at which beacon information has been received (relative time obtained from the timer 16), and the elapsed time=0 in the added record (Step S805), and then proceeds to Step S9 in FIG. 8.

If the relevant pupil identifier is found in the friend candidate information storage 123 (YES at Step S804), the hardware processor 11 adds the time that has elapsed from the last receiving time of the beacon information to the current receiving time of the beacon information to the elapsed time in the pupil identifier record in the friend candidate information storage 123, updates the receiving time with the current receiving time of the beacon information (Step S806), and proceeds to Step S9 in FIG. 8.

The hardware processor 11 performs the process of checking for the friend candidate information at Step S9 in FIG. 8 (Step S9).

Figure 10:
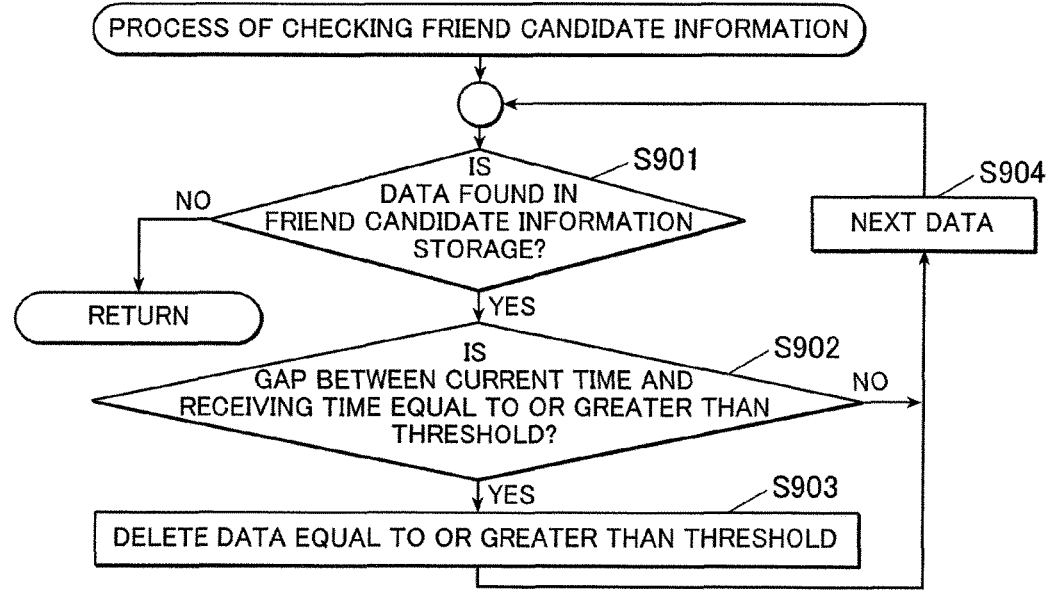
FIG. 10 is a flowchart illustrating a process of checking friend candidate information performed by the hardware processor in FIG. 2.

FIG. 10 is a flowchart illustrating the process of checking for the friend candidate information performed by the hardware processor 11 at Step S9. The process of checking for the friend candidate information is performed in cooperation with the hardware processor 11 and programs stored in the memory 12.

The hardware processor 11 determines whether any data is found in the friend candidate information storage 123 (Step S901).

If data is found in the friend candidate information storage 123 (YES at Step S901), the hardware processor 11 obtains the current time from the timer 16, and determines whether the gap between the current time that has been obtained and the receiving time in data (or a record) in the friend candidate information storage 123 is equal to or greater than a predetermined threshold TH (Step S902).

If not (NO at Step S902), the hardware processor 11 proceeds to Step S904.

If the gap between the current time and the receiving time is equal to or greater than the predetermined threshold TH (YES at Step S902), the hardware processor 11 deletes the data (or record) from the friend candidate information storage 123 (Step S903) and proceeds to Step S904.

At Step S904, the hardware processor 11 proceeds to the next data in the friend candidate information storage 123 (Step S904) and returns to Step S901.

If no data is found in the friend candidate information storage 123 at Step S901 (NO at Step S901), the hardware processor 11 proceeds to Step S10 in FIG. 8.

At Step S10 in FIG. 8, the hardware processor 11 determines whether the process of receiving beacon information has been repeated by the number of receiving operations determined at Step S5 (Step S10).

If not (NO at Step S10), the hardware processor 11 returns to Step S7.

If the process of receiving beacon information has been repeated by the number of receiving operations (YES at Step S10), the hardware processor 11 determines the number of sending operations (Step S11) and determines the transmission interval (a second transmission interval) (Step S12). The determined second transmission interval is shorter than the transmission interval determined at S19 described below (the first transmission interval).

The hardware processor 11 determines whether the current time is the sending time based on the determined transmission intervals (Step S13). If not (NO at Step S13), the hardware processor 11 returns to Step S1.

If sending time has arrived (YES at Step S13), the hardware processor 11 performs the process of sending the beacon information (Step S14).

Figure 11:
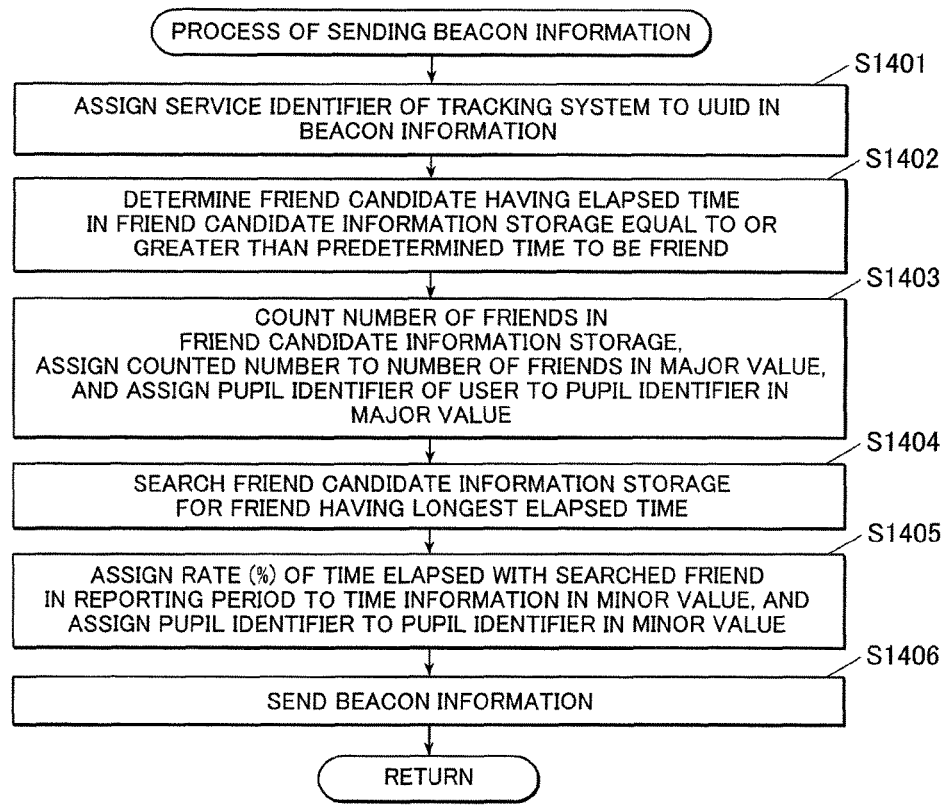
FIG. 11 is a flowchart illustrating a process of sending beacon information performed by the hardware processor in FIG. 2.

FIG. 11 is a flowchart illustrating the process of sending the beacon information performed by the hardware processor 11 at Step S14. The process of sending the beacon information is performed in cooperation with the hardware processor 11 and programs stored in the memory 12

The hardware processor 11 assigns the service identifier of the tracking system 100 to the UUID in the beacon information (Step S1401).

The hardware processor 11 determines presence of a pupil acting with the tracked user based on presence of a record having the elapsed time equal to or greater than a predetermined time in the friend candidate information storage 123. If a pupil acting with the user is present, the hardware processor 11 determines the friend candidate in the record to be a friend (Step S1402). The friend refers to a pupil acting (companion) with the user. In other words, the hardware processor 11 determines the pupil identified in the pupil identifier in the major value in the beacon information received by the near-field wireless communicator 14 continuously at intervals shorter than the threshold TH for a predetermined time or longer to be a friend of the tracked user.

The hardware processor 11 counts the number of friends in the friend candidate information storage 123, assigns the counted number to the number of friends in the major value, and assigns the pupil identifier of the tracked user in the memory 12 to the pupil identifier in the major value (Step S1403).

The hardware processor 11 searches the friend candidate information storage 123 for a friend having the longest elapsed time (Step S1404). The friend having the longest elapsed time represents a pupil acting with the tracked user for the longest time.

The hardware processor 11 calculates the rate (%) of the elapsed time in the record of the searched friend in the reporting period, assigns the calculated rate to the time parameter in the minor value, and assigns the pupil identifier to the pupil identifier in the minor value (Step S1405).

The hardware processor 11 sends the beacon information to the near-field wireless communicator 14 (Step S1406) and proceeds to Step S15 in FIG. 8.

At Step S15 in FIG. 8, the hardware processor 11 determines whether the process of sending the beacon information has been repeated by the number of sending operations determined at Step S11 (Step S15).

If not (NO at Step S15), the hardware processor 11 returns to Step S13.

If the process of sending the beacon information has been repeated by the number of sending operations (YES at Step S15), the hardware processor 11 returns to Step S5.

If the tracking system is in an information switching period at Step S3 (YES at Step S3), the hardware processor 11 determines whether the tracking system is in a receiving period (Step S16).

If the tracking system is in the receiving period (YES at Step S16), the hardware processor 11 proceeds to Step S7; otherwise (NO at Step S16), the hardware processor 11 proceeds to Step S13.

If the user is not walking or running at Step S2 (NO at Step S2), the hardware processor 11 determines whether the tracking system is in the information switching period (Step S17).

If not (NO at Step S17), the hardware processor 11 proceeds to Step S20.

If the tracking system is in the information switching period (YES at Step S17), the hardware processor 11 terminates the information switching period (Step S18) and sets a longer transmission interval (the first transmission interval) (Step S19).

The hardware processor 11 determines whether the current time is the sending time based on the determined transmission interval (Step S20).

If the sending time has arrived (YES at Step S20), the hardware processor 11 performs the process of sending the beacon information shown in FIG. 11 (Step S21) and then returns to Step S20.

If sending time has not arrived (NO at Step S20), the hardware processor 11 returns to Step S1.

The hardware processor 11 repeats the Steps from S1 to S21 while the system is energized.

Figure 12:
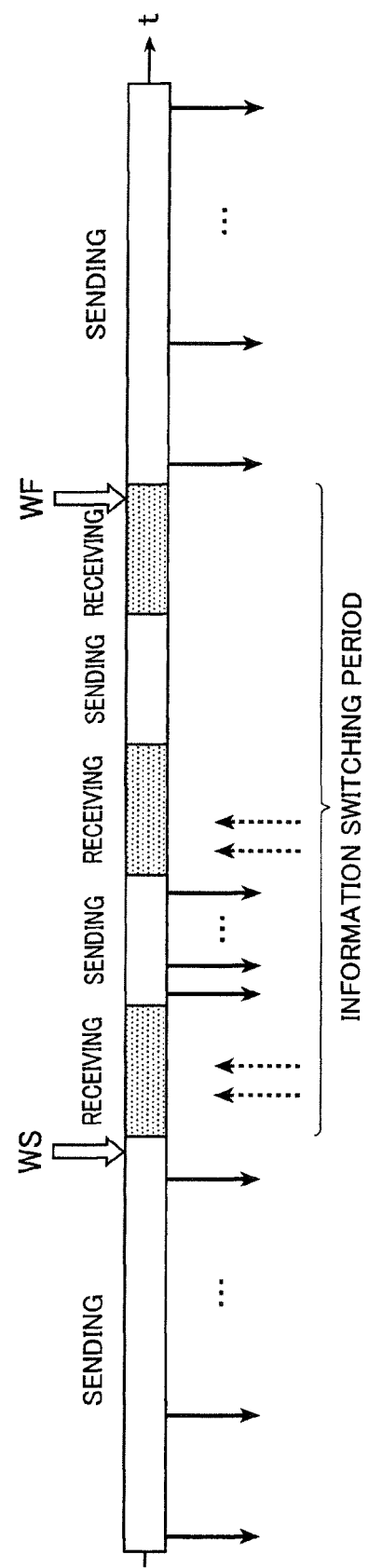
FIG. 12 illustrates sending and receiving operations of the POD terminal in the process of sending and receiving beacon information.

FIG. 12 illustrates sending and receiving operations of the POD terminal 1 in the process of sending and receiving the beacon information. In FIG. 12, the time point represented with the arrow WS indicates that the user is in a walking or running state. The time point represented with the arrow WF indicates that the user is in a state other than walking or running.

In the non-walking or running period, the POD terminal 1 sends the beacon information unilaterally at longer intervals, as shown in FIG. 12. In this period, the POD terminal 1 is expected to send the beacon information to the wireless communication device 2.

Upon detection of the walking or running state, the POD terminal 1 enters the information switching period involving alternation of sending and receiving the beacon information. In the sending and receiving terms in the information switching period, the beacon information is sent and received at intervals shorter than in the first transmission interval in the non-information switching period, as shown in FIG. 12. Since the pupil acting with the tracked user, who is walking or running, is also walking or running, the POD terminal 1 carried by the user also enters into the information switching period involving alternation of sending and receiving the beacon information. In the sending and receiving terms in the information switching period, the beacon information is sent and received at intervals shorter than in the first transmission interval in the non-information switching period. In other words, the beacon information that has been received from other POD terminal 1 while the tracked user is in the walking or running state can be regarded as that of the pupil acting with the tracked user. However, a pupil who does not act with the tracked user may happen to pass nearby and the beacon information of the pupil may be received. To eliminate such false detection, the hardware processor 11 according to this embodiment determines pupils who meet the following conditions to be friends of the tracked pupil: Carrying the POD terminal 1 from which the beacon information has been sent and received by the POD terminal 1 of the tracked user while the tracked user as running or walking, and accompanying the tracked user for a predetermined time or more (having the elapsed time equal to or greater than the predetermined time). This allows friends who are acting with the tracked user to be identified properly.

Repeated sending and receiving at shorter intervals while the system is energized consumes much energy from batteries. In the non-walking or running period, sending and receiving are performed at longer intervals to reduce energy consumption.

Operation of Wireless Communication Device 2

The operation of the wireless communication device 2 will now be explained.

Figures 13, 14:
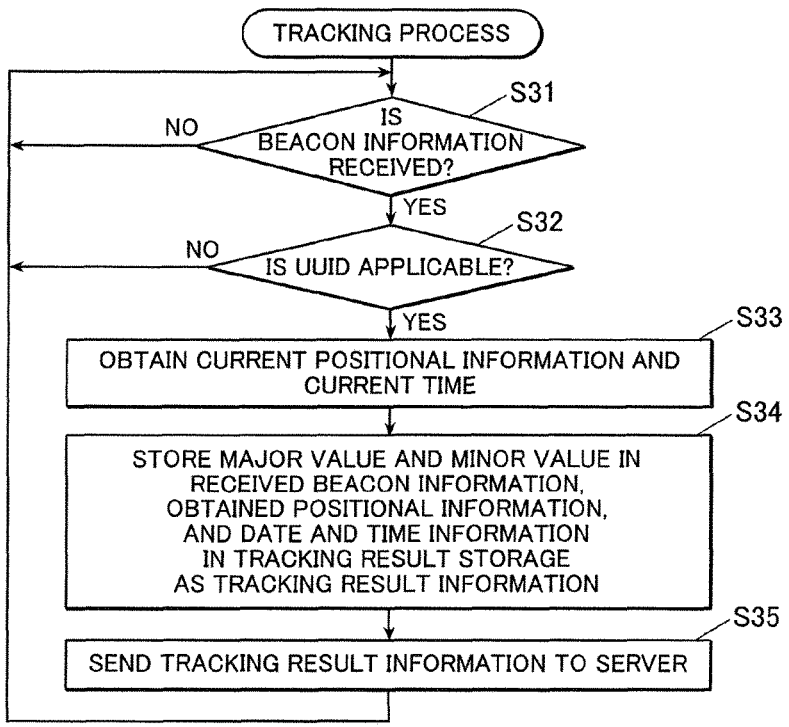
FIG. 13 is a flowchart illustrating a tracking process performed by the hardware processor in FIG. 4.
FIG. 14 illustrates exemplary tracking result information.

FIG. 13 is a flowchart illustrating a tracking process performed by the hardware processor 21 in the wireless communication device 2. The tracking process is performed in cooperation with the hardware processor 21 and programs stored in the memory 22.

The hardware processor 21 determines whether the near-field wireless communicator 24 has received the beacon information (Step S31).

If the near-field wireless communicator 24 does not receive the beacon information (NO at Step S31), the hardware processor 21 returns to Step S31.

Otherwise (YES at Step S31), the hardware processor 21 determines whether the UUID in the beacon information that has been received is the service identifier of the tracking system 100 (Step S32). If not (NO at Step S32), the hardware processor 11 returns to Step S31.

If the UUID in the received beacon information is the service identifier of the tracking system 100 (YES at Step S32), the hardware processor 11 instructs the GPS device 23 to obtain the current position information and the current time (Step S33).

The hardware processor 21 stores the major value and the minor value in the received beacon information, the current position information, and the current time in the tracking result storage 222 as tracking result information (Step S34). FIG. 14 illustrates exemplary tracking result information.

The hardware processor 21 sends the tracking result information to the server 3 via the network communicator 25 (Step S35) and then returns to Step S31.

The hardware processor 21 repeats the Steps from S31 to S35 while the system is energized.

Operation of the Server 3

The operation of the server 3 will now be explained.

Figures 15, 16:
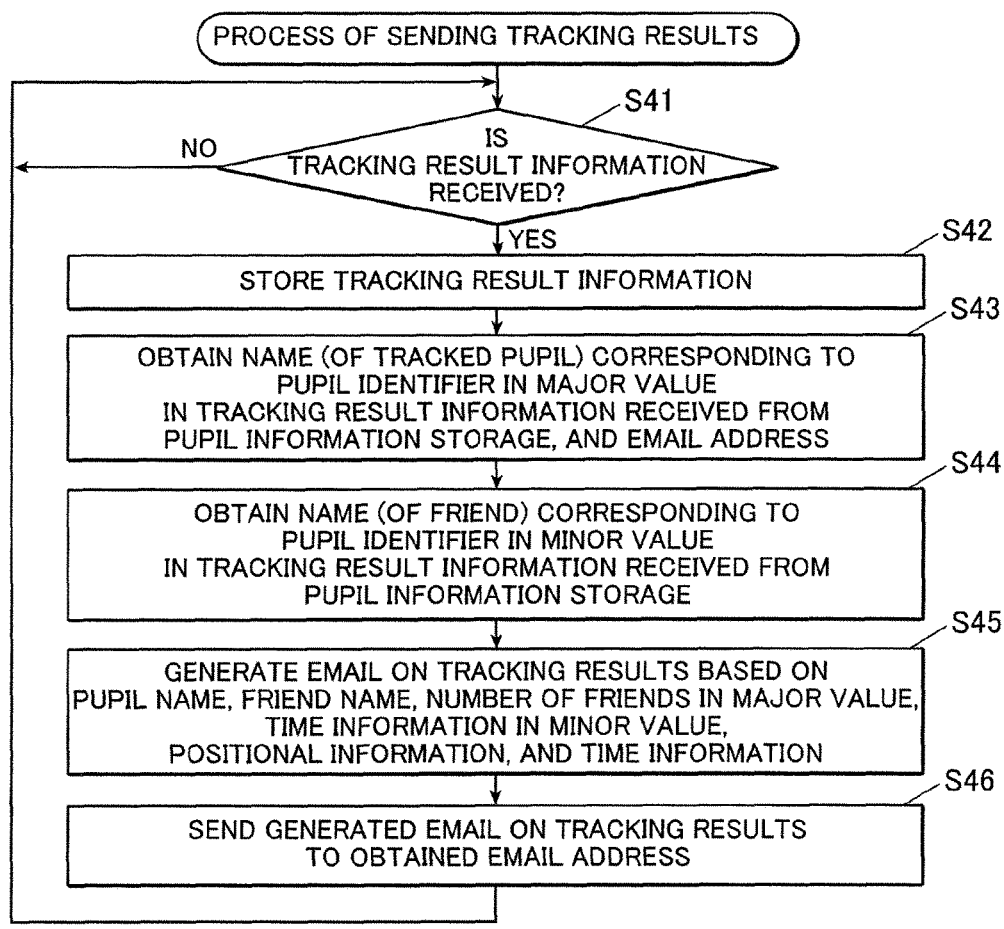
FIG. 15 is a flowchart illustrating a process of sending tracking results performed by the hardware processor in FIG. 5.
FIG. 16 illustrates exemplary email on tracking results.

FIG. 15 is a flowchart illustrating the process of sending the tracking results performed by the hardware processor 31 in the server 3. The process of sending the tracking results is performed in cooperation with the hardware processor 31 and programs stored in the memory 32.

The hardware processor 31 determines whether the communicator 33 has received the tracking result information from the wireless communication device 2 (Step S41).

If so (YES at Step S41), the hardware processor 31 stores the tracking result information that has been received in the tracking result storage 321 (Step S42).

The hardware processor 31 obtains a name corresponding to the pupil identifier in the major value in the received tracking result information (the name of the tracked pupil) and an email address from the pupil information storage 322 (Step S43).

The hardware processor 31 obtains a name corresponding to the pupil identifier in the minor value in the received tracking result information (the name of a friend) from the pupil information storage 322 (Step S44).

The hardware processor 31 generates email on tracking results based on the pupil name, the friend name, the number of friends in the major value in the tracking result information, the time parameter in the minor value, the position information, and the time parameter (Step S45). FIG. 16 illustrates exemplary email on tracking results.

The hardware processor 31 instructs the communicator 33 to send the generated email on the tracking results to the email address obtained at Step S43 (Step S46) and returns to Step S41.

The server 3 repeats the Steps from S41 to S46 while the system is energized.

Upon receipt of the email on the tracking results from the server 3 via the network communicator 44, the tracking terminal 4 displays the email on the tracking results on the display 47.

Figure 17:
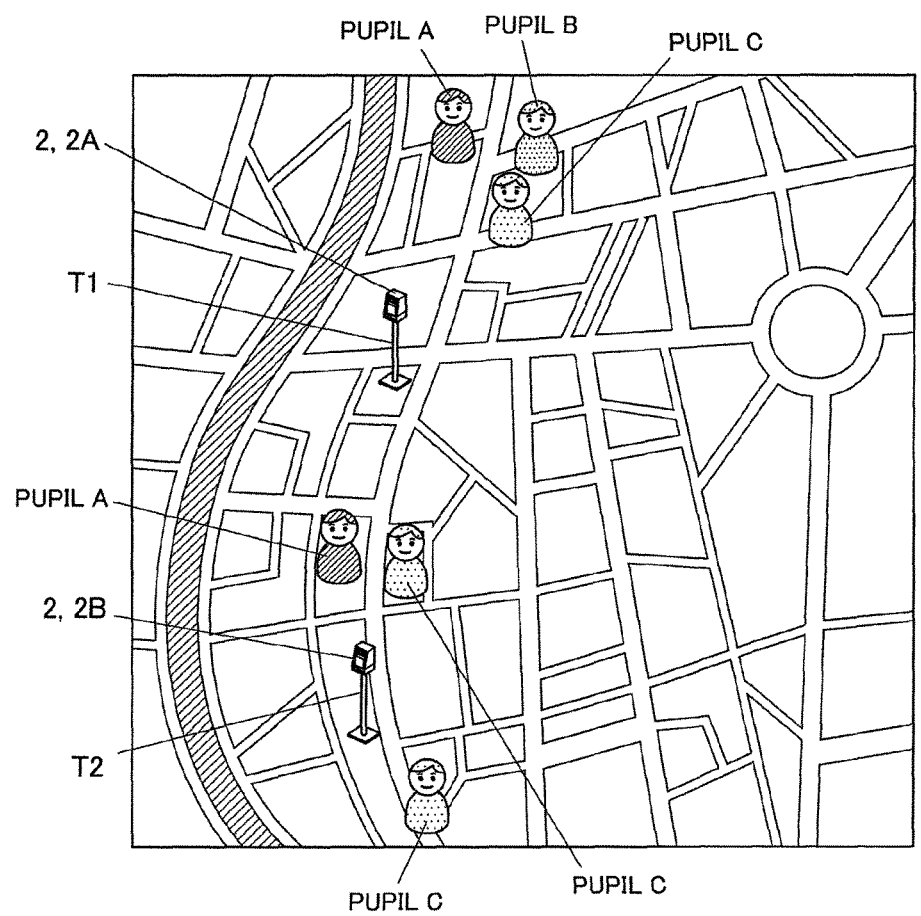
FIG. 17 illustrates an exemplary action of a pupil C on the way back home.

FIG. 17 illustrates an exemplary action of a pupil C on the way back home. As shown in FIG. 17, the pupil C goes back home with a pupil A and a pupil B until a time point T1 at which they passes by the wireless communication device 2 (2A). After T1, the pupil C separates from the pupil B and goes back home with the pupil A. After a time point T2 at which they passes by the wireless communication device 2(2B), the pupil C separates from the pupil A and goes back home alone.

Figure 18:
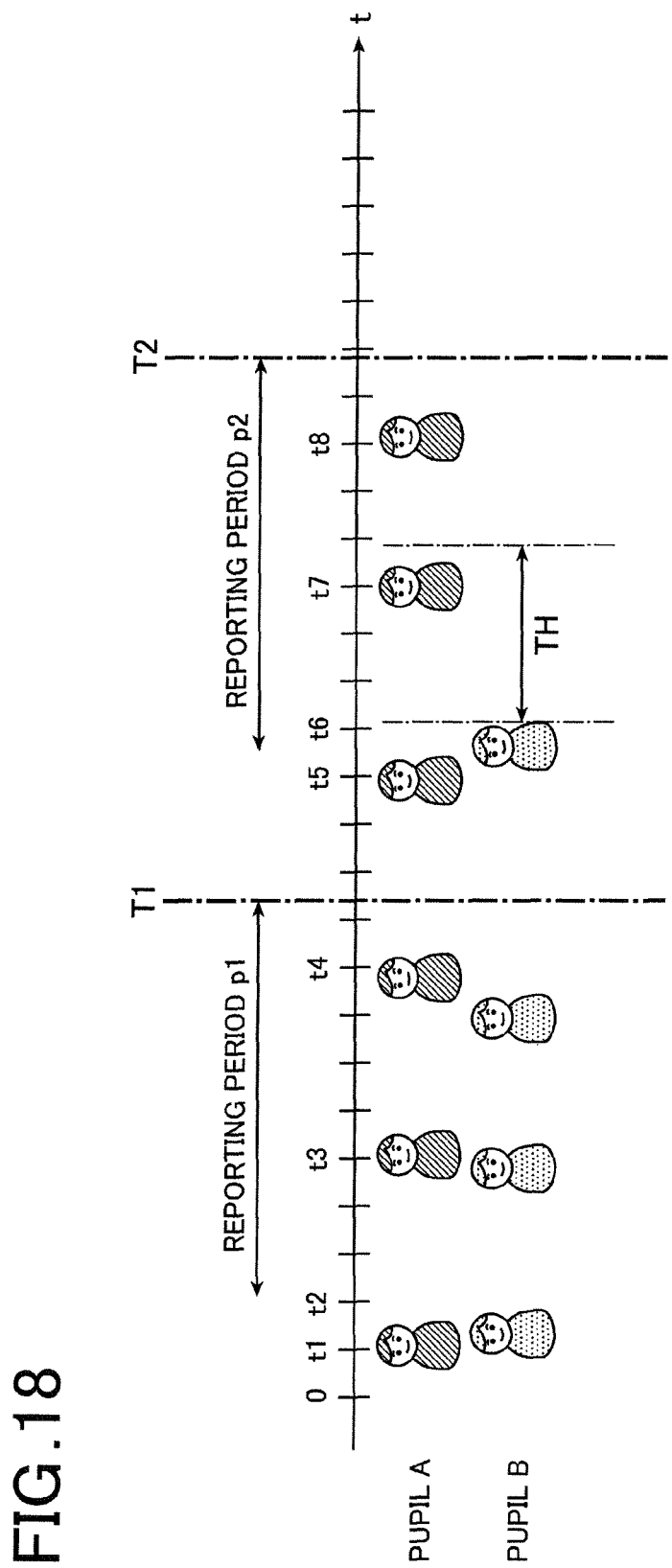
FIG. 18 is a chronological diagram illustrating timings at which the POD terminal of the pupil C received beacon information from a pupil A and a pupil B and sent beacon information to the wireless communication device shown in FIG. 17, and reporting periods.

FIG. 18 is a chronological diagram illustrating timings (t1-t8) at which the POD terminal 1 of the pupil C receives the beacon information from the pupil A and the pupil B, timings (T2 and T2) at which the POD terminal sends the beacon information to the wireless communication device 2, and reporting periods (p1 and p2) on the way back home shown in FIG. 17.

Figure 19A:
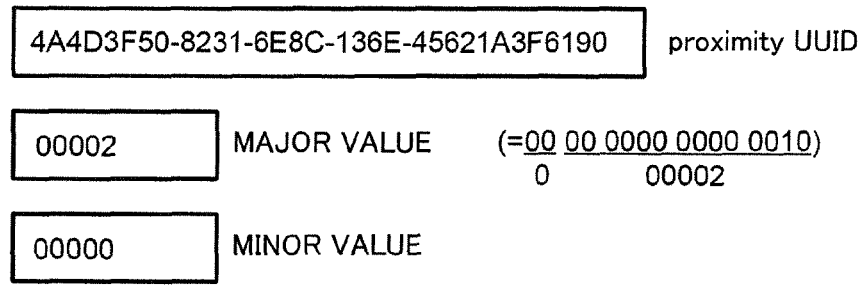
FIG. 19A illustrates exemplary beacon information that the POD terminal 1 of the pupil C received from the POD terminal 1 of the pupil B at a time point t1.
Figure 19B:
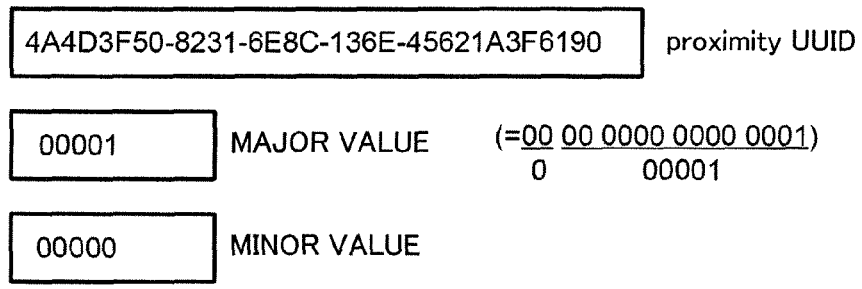
FIG. 19B illustrates exemplary beacon information that the POD terminal of the pupil C received from the POD terminal of the pupil A at the time point t1.
Figure 19C:
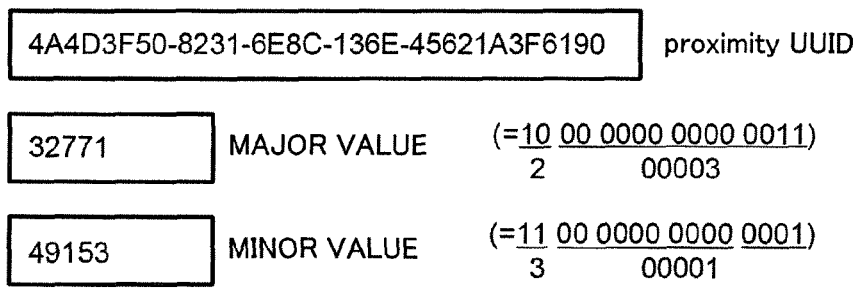
FIG. 19C illustrates exemplary beacon information that the wireless communication device received from the POD terminal of the pupil C at a time point T1.
Figure 19D:
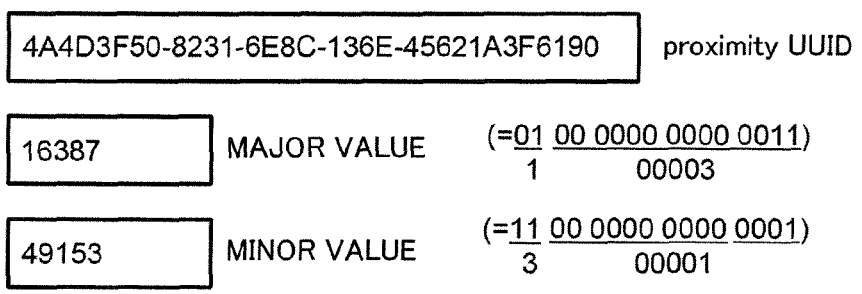
FIG. 19D illustrates exemplary beacon information that the wireless communication device received from the POD terminal of the pupil C at a time point T2.

FIG. 19A illustrates exemplary beacon information that the POD terminal 1 of the pupil C received from the POD terminal 1 of the pupil B at the time point t1. FIG. 19B illustrates exemplary beacon information that the POD terminal of the pupil C received from the POD terminal 1 of the pupil A at the time point t1. FIG. 19C illustrates exemplary beacon information that the wireless communication device 2 (2A) received from the POD terminal 1 of the pupil C at the time point T1. FIG. 19D illustrates exemplary beacon information that the wireless communication device 2(2B) received from the POD terminal 1 of the pupil C at the time point T2. The UUIDs shown in FIG. 19A to 19D represent the service identifiers of the tracking system 100. The identifiers of the pupil A, the pupil B, and the pupil C are 00001, 00002, and 00003, respectively.

As shown in FIGS. 17 and 18, the pupil C acts with the pupil A and the pupil B in the reporting period p1. Since the last beacon receiving time from the pupil A is later than that from the pupil B, the wireless communication device 2(2A) receives the beacon information containing the following information from the POD terminal 1 of the pupil C at the time point T1: The number of friends in the major value set to 2, pupil identifier in the minor value set to 00001, which indicates the pupil A, and the time parameter set to 3 (75% or more). In the reporting period P2, the pupil C acts with only the pupil A. This results in the wireless communication device 2(2B) receiving the beacon information containing the following information from the POD terminal 1 of the pupil C at the time point T2: The number of friends in the major value set to 1, pupil identifier in the minor value set to 0001, which indicates the pupil A, and the time parameter set to 3 (75% or more).

FIG. 14 illustrates exemplary tracking result information generated when the wireless communication device 2(2B) receives the beacon information shown in FIG. 19D from the POD terminal 1 of the pupil C at the time point T2. As shown in FIG. 14, the wireless communication device 2(2B) adds the current position and the current time to the major value and the minor value in the beacon information that has been received at the time point T2 and sends the added beacon information to the server 3 as tracking result information.

FIG. 16 illustrates exemplary email on the tracking results sent by the server 3 that has received the beacon information shown in FIG. 14 to the tracking terminal 4 of a parent of the pupil C. As shown in FIG. 16, the email on the tracking results contains the position of the wireless communication device 2(2B), time at which the pupil C passes by the wireless communication device 2(2B), the number of friends who were with the pupil C at the time of passage, and the name of a longest staying companion. This allows the tracking system to send information on friends who were with the pupil C at the time of passage by the wireless communication device 2(2B) to the parent.

As described above, the hardware processor 11 in the POD terminal 1 in the tracking system 100 obtains information on the action of the tracked user based on the output from the sensor 13 and determines whether the tracked user performs a predetermined action. If so, the hardware processor 11 instructs the near-field wireless communicator 14 to receive the beacon information containing pupil identifier from another POD terminal 1. The hardware processor 11 determines whether the near-field wireless communicator 14 receives the pupil identifier continuously for a predetermined time or longer. Based on this information, the hardware processor 11 determines presence of a companion acting with the tracked user. If such a companion is present, the hardware processor 11 determines the pupil identified with the identifier to be a companion acting with the tracked user.

This allows the tracking system to determine presence of and identify a companion acting with the tracked user.

The hardware processor 11 in the POD terminal 1 instructs the near-field wireless communicator 14 to send the beacon information containing the user identifier of the tracked user and a companion to the wireless communication device 2. Upon receipt of the beacon information from the POD terminal 1, the wireless communication device 2 obtains the current position and the current time and sends the obtained current position and the current time to the server 3 along with the received beacon information. In response to the information received from the wireless communication device 2, the server 3 sends the positions of places that the tracked user passes by and time at which the tracked user passes by each place, and information on the companion acting with the tracked user (For example, the number of companions and the name of the longest-staying companion) to the tracking terminal 4.

This allows the tracking system to provide the parent tracking the tracked user with information on the positions of places that the tracked user passes by, the time at which the tracked user passes by each place, and the companion acting with the tracked user.

The user identifier further includes information on the user (companion) of another terminal. The tracking system determines whether information on the action of another terminal user (companion) in the user identifier received from another terminal via the near-field wireless communication link is identical to that on the action of the tracked user. Based on this determination, the tracking system determines presence of a companion acting with the tracked user.

This allows the tracking system to determine presence of and identify a companion acting with the tracked user.

The friend candidate information storage 123 contains information on a friend candidate obtained from the received beacon information, such as the pupil identifier, the receiving time, and elapsed time. The tracking system 100 may store information on the tracked user. In details, the tracking system 100 may have a storage containing the user identifier of the tracked user, the name of the tracked user, and an email address to which the tracking results of the tracked user is sent, and store the information in the storage with these pieces of information linked to each other. The parent can always check the information on the tracked user.

The user identifier is the pupil identifier, stored in the memory 12, of a tracked pupil carrying the POD terminal 1. The pupil identifier on the tracked user and a friend candidate is preliminarily generated using the history of communications with other POD terminals 1 or user entries, and stored in the POD terminal 1. This facilitates identification of a POD terminal user linked to the pupil identifier.

The embodiment described above is a preferred example of the companion determining device and the companion determining system according to the present invention, should not be construed to limit the present invention, and various modifications may be made.

In the above embodiment, for example, the wireless communication device 2 installed in a town or along a school route receives the beacon information from the POD terminal 1, generates tracking result information from the beacon information that has been received, and sends the generated tracking result information to the server 3. The wireless communication device 2 need not be installed in a town or along a school route. For example, the tracking terminal 4 may include a near-field wireless communicator. The tracking terminal 4, which serve as the wireless communication device 2, may receive the beacon information from the POD terminal 1 of a pupil passing nearby and sends the tracking result information to the server 3.

In the above embodiment, the tracking system regards a period in which the tracked user carrying the POD terminal 1 is running or walking as the information switching period, and receives the beacon information. Alternatively, a period in which the tracked user takes a different action may be regarded as the information switching period.

In the above embodiment, the tracking system 100 tracks pupils. Alternatively, the tracking system 100 may track, for example, the elderly.

In the above description, programs according to the present invention are stored in a computer-readable recording medium, such as hard disk and a nonvolatile memory of a semiconductor. Any other type of computer-readable recording medium may be used, for example, a portable recording medium, such as CD-ROM. The present invention is also applicable to carrier waves, a medium which provides the programs according to the present invention with data via a communication line.

The detailed configuration and operations of the companion determining device and the companion determining system may be appropriately modified without departing from the scope of the present invention.

Although various embodiments of the present invention are described, the scope of the present invention should not be limited to the above embodiments and includes the scope of the claims and a scope equivalent thereto.

What is claimed is:

1. A companion determining device that determines presence of a companion of a tracked user, the device comprising:
   a receiver which receives a user identifier from an external device via a near-field wireless communication link;
   a receipt determiner which determines whether the receiver has received the user identifier sent from the external device; and
   a presence determiner which determines presence of a companion acting with the tracked user based on determination by the receipt determiner;
   an action information obtainer which obtains information on an action taken by the tracked user,
   wherein
   the receiver receives the user identifier and the action information of the user of the external device, and
   the presence determiner determines presence of a companion acting with the tracked user based on whether the action information on the user of the external device is identical to a predetermined action taken by the tracked user which is obtained by the action information obtainer and on determination by the receipt determiner, the action information being received via the near-field wireless communication link from the external device.

2. The companion determining device according to claim 1, wherein the presence determiner determines presence of a companion acting with the tracked user based on presence of the user identifier that has been received by the receiver continuously for a predetermined time or more without an interval equal to or more than a predetermined threshold.

3. The companion determining device according to claim 1, wherein the presence determiner determines a person identified with the user identifier that has been received continuously by the receiver for a predetermined time or more to be the companion acting with the tracked user.

4. The companion determining device according to claim 1, further comprising:
   a transmitter which sends the user identifier of the tracked user via the near-field wireless communication link; and
   a hardware processor which instructs the transmitter to send the user identifier in a case where the action information obtainer has not obtained the action information indicating that the tracked user is taking the predetermined action.

5. The companion determining device according to claim 4, wherein the hardware processor controls a communication interval of the receiver or the transmitter based on the action information obtained by the action information obtainer.

6. The companion determining device according to claim 5, wherein the hardware processor instructs the transmitter to send the user identifier of the tracked user at first transmission intervals while the action information obtainer does not obtain the action information indicating that the tracked user is taking the predetermined action,
the hardware processor instructs the transmitter to alternate a sending term and a receiving term while the action information obtainer obtains the action information indicating that the tracked user is taking the predetermined action,
the sending term involves transmission of the user identifier of the tracked user at second transmission intervals shorter than the first transmission intervals, and
the receiving term involves receipt of the user identifier from the external device at receiving intervals shorter than the first transmission intervals.

7. The companion determining device according to claim 1, wherein the receipt determiner instructs the receiver to determine whether the user identifier sent from the external device is received in a case where the action information obtainer obtains the action information indicating that the tracked user is taking the predetermined action.

8. The companion determining device according to claim 1, wherein the receipt determiner instructs the receiver to determine whether the action information sent from the external device is received in the case where the action information obtainer obtains the action information indicating that the tracked user is taking the predetermined action.

9. The companion determining device according to claim 1, wherein the presence determiner determines presence of a companion acting with the tracked user based on whether the user identifier has been continuously received by the receiver for a predetermined time or more.

10. The companion determining device according to claim 1, further comprising:
    a memory storing the user identifier, the name of the tracked user, and a sending destination of tracking results.

11. The companion determining device according to claim 1, further comprising:
    a memory storing the user identifier,
    wherein
    the presence determiner determines presence of a companion acting with the tracked user based on whether the user identifier received by the receiver is the same as the user identifier stored in the memory.

12. The companion determining device according to claim 1, further comprising:
    a sensor which detects the action taken by the tracked user,
    wherein the action information obtainer obtains the action information of the tracked user based on output from the sensor.

13. The companion determining device according to claim 12, wherein the sensor is at least one of an acceleration sensor, an angular rate sensor, and a GPS device.

14. A companion determining system comprising:
    a companion determining device comprising:
       a receiver which receives a user identifier from an external device via a near field wireless communication link; and
       a presence determiner which determines a person identified with the user identifier that has been received continuously by the receiver for a predetermined time or more to be a companion acting with a tracked user;

a wireless communication device which sends and receives data to and from the companion determining device via the near-field wireless communication link;

a server which sends and receives data to and from the wireless communication device; and a terminal device carried by a guardian tracking the user, wherein the companion determining device sends information, including the user identifier of the tracked user and the user identifier of a companion acting with the tracked user, to the wireless communication device via the near-field wireless communication, when the wireless communication device receives the information including the user identifier of the tracked user and the user identifier of the companion acting with the tracked user from the companion determining device, the wireless communication device obtains the current position and the current time and sends the received information and the obtained information to the server, and the server sends information on the positions of places the tracked user passes by, the time at which the tracked user passes by each place, and the companion acting with the tracked user to the terminal device based on the information received from the wireless communication device.

15. The companion determining system according to claim 14, wherein the companion determining device obtains the number of companions acting with the tracked user and the user identifier of a companion acting with the tracked user for a longest time based on the user identifier received from the external device, and sends the user identifier of the tracked user and the obtained information to the wireless communication device, the wireless communication device sends information received from the companion determining device as well as the current position and the current time obtained when the information is received from the companion determining device to the server, and the server sends the positions of places the tracked user passes by, the time at which the tracked user passes by each place, the number of companions acting with the tracked user, and the name of a companion acting together for the longest time to the terminal device based on information received from the wireless communication device.

16. A method for determining presence of a companion of a tracked user in a companion determining device, the method comprising:

a receipt step of receiving a user identifier sent from an external device via a near-field wireless communication link;

a receipt determination step of determining whether the user identifier sent from the external device is received in the receipt step;

a presence determination step of determining presence of a companion acting with the tracked user based on determination in the receipt determining step; and an action information obtaining step of obtaining information on an action taken by the tracked user, wherein the receipt step includes receiving the user identifier and the action information of the user of the external device, and the presence determination step includes determining the presence of the companion acting with the tracked user based on whether the action information on the user of the external device is identical to a predetermined action taken by the tracked user which is obtained in the action information obtaining step and on determination in the receipt determination step, the action information being received via the near-field wireless communication link from the external device.

* * * * *